United States Patent [19]

Loew

[11] 4,382,801
[45] May 10, 1983

[54] PROCESS FOR SPIN DYEING POLYMERS OR COPOLYMERS OF ACRYLONITRILE WITH QUATERNIZED HETEROCYCLIC DIAZO DYE AND TETRAFLUORO-BORATE ANION

[75] Inventor: Peter Loew, Münchenstein, Switzerland

[73] Assignee: Ciba-Geigy Corporation, Ardsley, N.Y.

[21] Appl. No.: 330,745

[22] Filed: Dec. 14, 1981

[30] Foreign Application Priority Data

Dec. 24, 1980 [CH] Switzerland ................... 95751/80

[51] Int. Cl.³ ................... C09B 44/10; D06P 3/60
[52] U.S. Cl. ................... 8/538; 8/489; 8/655; 8/927; 524/92; 524/93; 524/94; 524/95; 524/99; 260/154; 260/155; 260/156; 260/157; 260/158; 260/159; 264/78
[58] Field of Search ................... 8/538, 489, 655; 524/92, 93, 94, 95, 99; 264/78

[56] References Cited
U.S. PATENT DOCUMENTS 4,051,084  9/1977  Kuhlthau et al. ................... 8/655
4,160,643  7/1979  Gresory ................... 8/655

FOREIGN PATENT DOCUMENTS 1514263  6/1978  United Kingdom .
2022099  12/1979  United Kingdom .

*Primary Examiner*—A. Lionel Clingman
*Attorney, Agent, or Firm*—Harry Falber

[57] ABSTRACT

The invention relates to a process for spin dyeing polymers of acrylonitrile or copolymers containing predominantly acrylonitrile, which process comprises adding to the spinning solution a monocationic dye salt of the formula

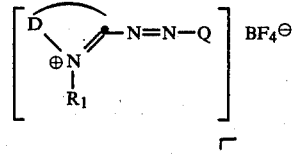

wherein D is the group of atoms necessary to close a 5-membered heterocyclic ring containing two N-atoms, or to close a 6-membered heterocyclic ring, which rings may optionally contain fused benzene rings, or is the group of atoms necessary to close a benzthiazole ring, and Q is the radical of a carbocyclic or heterocyclic aromatic coupling component, and $R_1$ is alkyl, aralkyl or aryl. The yellowish-red transparent fibres obtained have excellent fastness properties.

12 Claims, No Drawings

PROCESS FOR SPIN DYEING POLYMERS OR COPOLYMERS OF ACRYLONITRILE WITH QUATERNIZED HETEROCYCLIC DIAZO DYE AND TETRAFLUORO-BORATE ANION

From German Auslegeschrift No. 2 433 233 and British patent specification No. 2,022,099 it is known that polyacrylonitrile can be spin dyed with boron tetrafluoroborates of basic azo dyes which contain a quaternised triazole radical as diazo component.

It has now been found that polymers of acrylonitrile can be excellently dyed by adding to the spinning solution a monocationic dye salt of the formula

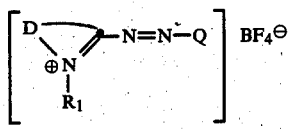

wherein D is the group of atoms necessary to close a 5-membered heterocyclic ring containing two N-atoms, or to close a 6-membered heterocyclic ring, which rings may optionally contain fused benzene rings, or is the group of atoms necessary to close a benzthiazole ring, and Q is the radical of a carbocyclic or heterocyclic aromatic coupling component, and $R_1$ is alkyl, aralkyl or aryl.

In the dye salts of the formula (I) to be used in the practice of this invention, D is preferably the group of atoms necessary to close a pyrazole, benzypyrazole, imidazole, benzimidazole or benzthiazole ring.

Specific radicals of the pyrazole series are those of the formula

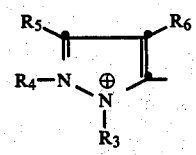

wherein $R_3$ and $R_4$ are $C_1$-$C_4$alkyl, unsubstituted or substituted by OH, chlorine or $CONH_2$, or phenyl or phenyl substituted by chlorine, methyl or $C_1$-$C_2$alkoxy, $R_5$ and $R_6$ are hydrogen, $C_1$-$C_4$alkyl or phenyl, or $R_5$ and $R_6$ are a fused benzene ring. Examples are the radicals of the formulae

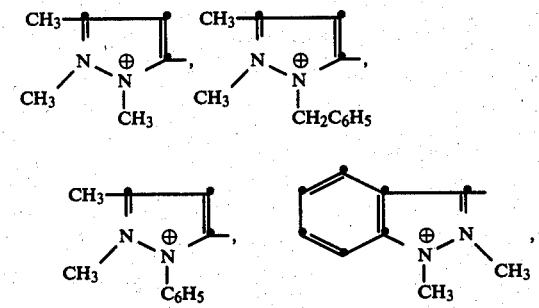

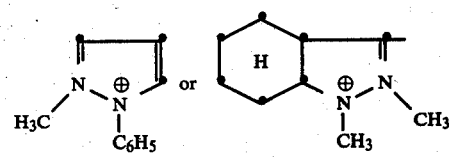

A specific radical of the imidazole series is that of the formula

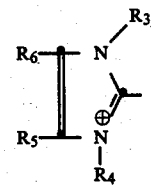

wherein $R_3$ to $R_6$ are as defined above. Examples are the radicals of the formulae

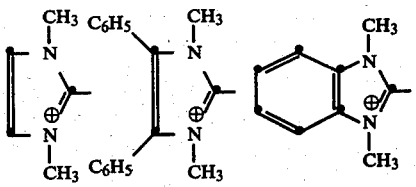

Finally, D can also be a benzthiazole radical. This radical may be substituted in the benzene nucleus e.g. by chlorine, methyl, $C_1$-$C_2$alkoxy or acylamino. The preferred radical is that of the formula

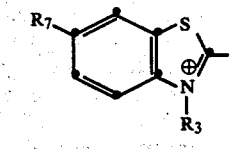

wherein $R_3$ has the given meaning, $R_7$ is hydrogen, chlorine, methyl, $C_1$-$C_2$alkoxy or $C_2$-$C_4$alkanoylamino.

Examples of such radicals are:

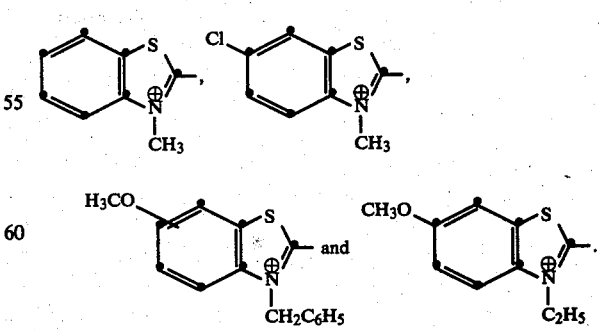

Examples of 6-membered heterocyclic rings are the pyridines, quinolines or pyrimidines. Preferred are the pyridine or quinoline radicals of the formulae

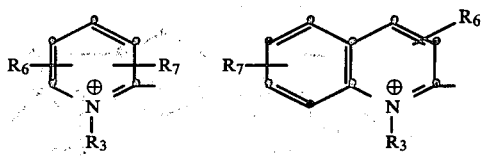

wherein R₃ has the given meaning, R₆ and R₇ are hydrogen, chlorine, methyl, ethyl or $C_1$–$C_2$alkoxy. Examples are the radicals of the formulae

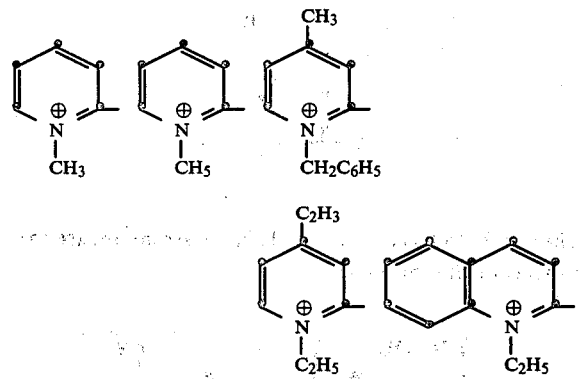

Q as the radical of a carbocyclic coupling component is e.g. a 4-aminonaphthalene radical, but is preferably a phenyl radical, in particular a radical of the formula

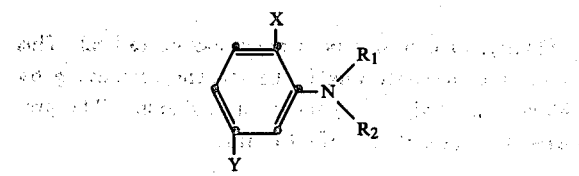

wherein $R_1$ is hydrogen, $C_1$–$C_4$alkyl unsubstituted or substituted by hydroxy, $C_1$–$C_2$alkoxy, $C_1$–$C_4$alkanoyloxy or cyano, or is cyclohexyl or benzyl, or is phenyl or phenyl substituted by chlorine, methyl or $C_1$–$C_2$alkoxy, $R_2$ is hydrogen, $C_1$–$C_4$alkyl unsubstituted or substituted by hydroxy, $C_1$–$C_2$alkoxy, $C_1$–$C_4$alkanoyloxy or cyano, or is cyclohexyl or benzyl, X and Y are hydrogen, methyl or $C_1$–$C_2$alkoxy, or wherein $R_1$ and $R_2$, together with the nitrogen atom to which they are attached, form a 5- or 6-membered ring which may optionally contain additional N- or O-atoms.

Representative examples are the radicals of aniline,
N-methylaniline,
N-ethylaniline,
N,N-dimethylaniline,
N,N-diethylaniline,
N-isobutylaniline,
N,N-di-n-butylaniline,
N-methyl-N-benzylaniline,
N,N-dibenzylaniline,
N-ethyl-N-β-acetoxyethylaniline,
N,N-bis-β-acetoxyethylaniline,
N,N-bis-β-cyanoethylaniline,
N-methyl-n-phenylaniline
N-methyl-N-p-methoxyphenylaniline and
N-ethyl-N-hydroxyethylaniline.

Q as a heterocyclic radical is preferably an indole radical, especially one of the formula

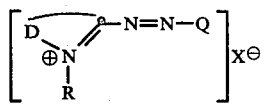

wherein $R_8$ is $C_1$–$C_4$alkyl or phenyl, $R_9$ is hydrogen, $C_1$–$C_4$alkyl or cyanoethyl, and Z is hydrogen, chlorine, methyl or $C_1$–$C_2$alkoxy.

Representative examples of such radicals are the radicals of 2-methylindole-3, 1,2-dimethylindole-3, 2-phenylindole-3, 1-methyl-2-phenylindole-3, 1-butyl-2-methylindole-3, 1-cyanoethyl-2-methylindole-3, 5-chloro-, 5-methyl- or 5-methoxy-2-phenylindole-3.

The tetrafluoroborates are conveniently obtained by reacting a dye salt of the formula $$\left[ D \underset{\underset{R}{\overset{\oplus}{N}}}{\overset{\frown}{\diagup}} N=N-Q \right] X^{\ominus}$$

wherein D, Q and R have the given meanings and $X^{\ominus}$ is a water-solubilising anion, with sodium tetrafluoroborate. Preferred water-solubilising anions are chlorides, bromides, sulfates, methyl sulfates or acetates. The tetrafluoroborates precipitate on account of their reluctant solubility. The starting salts are known compounds.

For use, the dye salts of this invention are conveniently dissolved in the solvent employed for dissolving the polyacrylonitrile, such as dimethyl formamide, dimethyl acetamide or dimethyl sulfoxide, and then added to the spinning solution. The mixture is homogenised and then spun in conventional manner, e.g. by the dry spinning method or by the wet spinning method, and the fibres so obtained are treated in the customary manner.

The dye salts of the invention have very good solubility in the specified solvents even at room temperature, so that they can also advantageously be used in the form of concentrated solutions containing about 5 to 40% of dye. The solubility of the dyes can be further substantially increased by raising the temperature. In addition, the dye salts have high colour strength on account of the relatively small anion—a property which permits economical dyeing.

Besides the polymers of acrylonitrile, suitable substrates are copolymers of acrylonitrile with other vinyl compounds, e.g. with vinyl chloride, vinyl fluoride, vinylidene chloride, vinyl acetate or vinyl propionate, vinyl pyridine, vinyl imidazole, vinyl pyrrolidone, vinyl alcohol, acrylates, methacrylates or acrylamides, which copolymers must contain at least 70% by weight of acrylonitrile and also acid groups which have been introduced into the polymer as end groups by means of a catalyst or have been introduced or grafted by comonomers containing such acid groups.

The process of this invention gives completely transparent, clean spinning solutions which cause no clogging or mechanical wear and tear of the spinnerets. The spun filaments and fibres obtained show no tendency to dulling as a result of the substantially molecular dispersion of the dyes of this invention in contrast to most of the pigment dyes used at the present time. Further, the materials coloured with the dyes of this invention by the process of the invention have very good wetfastness properties. The fibres obtained also have extremely good fastness to rubbing owing to the absence of dye aggregates on the surface of the fibres such as can occur in spin dyeing with pigment dyes. In addition, the excellent fastness to thermofixation, steaming, washing and light also merits special mention.

As the tetrafluoroborate dye salts employed in the practice of this invention can be very readily precipitated in coarse-crystalline form and substantially salt-free from the aqueous solutions obtained in the synthesis, the use of spinning solutions which contain these dyes has the particular advantage that inorganic accompanying salts in the aprotic solvents employed as spinning dope do not first have to be isolated before spinning, so that, in particular, additional process steps are avoided. The surprisingly low water-solubility of the dye salts of the invention is a further advantage in view of the bleeding of the dye salt in the aqueous precipitation bath.

The invention is further illustrated by the following Examples.

EXAMPLE 1

To 100 parts of a 30% solution of acid modified polyacrylonitrile in dimethyl formamide are added 5 parts of a 5% solution of a dye salt of the formula

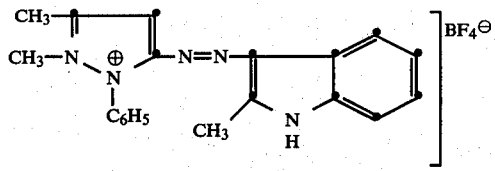

in dimethyl formamide. The spinning solution is homogenised and spun by a dry spinning process known and commonly employed in the art. The filaments obtained are dyed a deep, yellow shade and additionally have a high gloss. The fastness properties, especially the lightfastness, rub fastness, fastness to thermofixation, washfastness and fastness to steaming, are exceptionally good.

Coloured filaments of equally good properties are obtained by a wet spinning process commonly employed in the art. The precipitation and drawing baths are only stained to an extremely insignificant extent.

EXAMPLE 2

The dye salt employed in Example 1 can be prepared as follows:

290 g of the dye of the formula

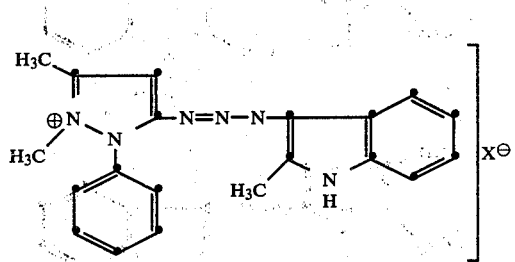

($X = SO_4CH_3$) are dissolved in 2200 ml of aqueous acetic acid and the solution is added dropwise to 104 g of $NaBF_4$ in 900 ml of water. The precipitated product ($X = BF_4$) is isolated by filtration, washed with water and dried, affording 258 g of a yellow powder which is sparingly soluble in water.

EXAMPLES 3 TO 20

The following table lists the tetrafluoroborates of further dyestuff cations which were used for spin dyeing polyacrylonitrile in accordance with the procedure of Example 1. Column 3 indicates the shade of the coloured fibres.

TABLE

| Example | Cation | Shade |
|---|---|---|
| 3 | [structure with CH$_3$, N, CH$_3$, –N=N–, –N(CH$_3$)(CH$_2$C$_6$H$_5$)] | orange |
| 4 | [structure with CH$_3$, N, CH$_3$, –N=N–, –N(n-C$_4$H$_9$)$_2$] | red |
| 5 | [structure with CH$_3$, N, CH$_3$, –N=N–, –N(CH$_2$C$_6$H$_5$)$_2$] | orange |
| 6 | [structure with CH$_3$, N, CH$_3$, –N=N–, indole with CH$_3$, NH] | yellow |

TABLE-continued
| Example | Cation | Shade |
|---|---|---|
| 7 | 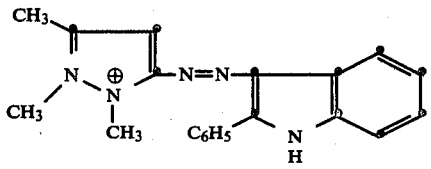 | yellow |
| 8 | 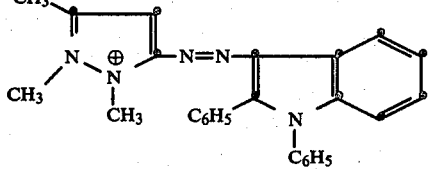 | yellow |
| 9 | 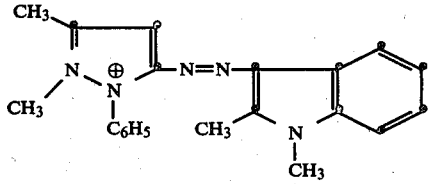 | yellow |
| 10 | 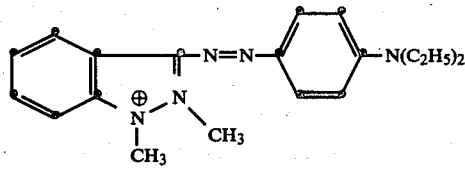 | violet |
| 11 | 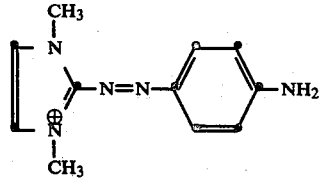 | orange |
| 12 | 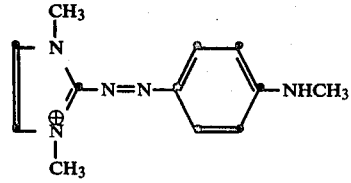 | scarlet |
| 13 | 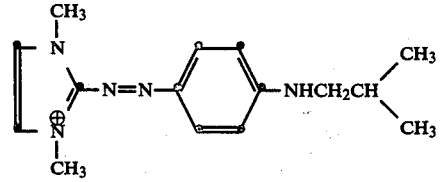 | scarlet |
| 14 | 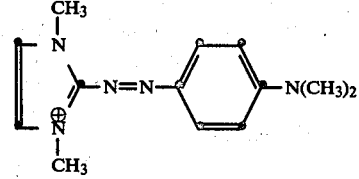 | red |

TABLE-continued

| Example | Cation | Shade |
|---|---|---|
| 15 | (structure) | red |
| 16 | (structure) | blue |
| 17 | (structure) | blue |
| 18 | (structure) | blue |
| 19 | (structure) | blue |
| 20 | (structure) | blue |

What is claimed is:

1. A process for spin dyeing polymers of acrylonitrile or copolymers containing predominantly acrylonitrile, which process comprises adding to the spinning solution a monocationic dye salt of the formula

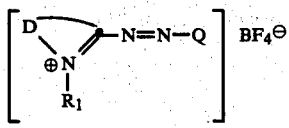

wherein D is the group of atoms necessary to close a 5-membered heterocyclic ring containing two N-atoms, or to close a 6-membered heterocyclic ring, which rings may optionally contain fused benzene rings, or is the group of atoms necessary to close a benzthiazole ring, and Q is the radical of a carbocyclic or heterocyclic aromatic coupling component, and $R_1$ is alkyl, aralkyl or aryl.

2. A process according to claim 1, wherein D is the group of atoms necessary to close a pyrazole or imidazole ring.

3. A process according to claim 1, wherein D is the group of atoms necessary to close a benzthiazole ring.

4. A process according to claim 1 which comprises the use of a dye salt of the formula

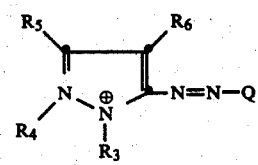

wherein $R_3$ and $R_4$ are unsubstituted or substituted $C_1$–$C_4$alkyl, benzyl, or phenyl or phenyl substituted by chlorine, methyl or $C_1$–$C_2$alkoxy, $R_5$ and $R_6$ are hydrogen, $C_1$–$C_4$alkyl or phenyl, or $R_5$ and $R_6$ are a fused benzene ring.

5. A process according to claim 1 which comprises the use of a dye salt of the formula

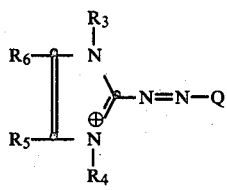

wherein $R_3$ to $R_6$ are as defined in claim 3.

6. A process according to claim 1 which comprises the use of a dye salt of the formula

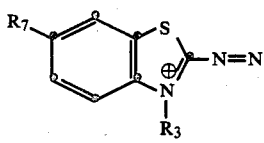

wherein $R_3$ is as defined in claim 4 and Q is as defined in claim 1, $R_7$ is hydrogen, chlorine, methyl, $C_1$-$C_2$alkoxy or $C_1$-$C_4$alkanoylamino.

7. A process according to claim 1, wherein Q is a radical of the formula

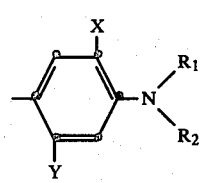

wherein $R_1$ is hydrogen, $C_1$-$C_4$alkyl unsubstituted or substituted by hydroxy, $C_1$-$C_2$alkoxy, $C_1$-$C_4$alkanoyloxy or cyano, or is cyclohexyl or benzyl, or is phenyl or phenyl substituted by chlorine, methyl or $C_1$-$C_2$alkoxy, $R_2$ is hydrogen, $C_1$-$C_4$alkyl unsubstituted or substituted by hydroxy, $C_1$-$C_2$alkoxy, $C_1$-$C_4$alkanoyloxy or cyano, or is cyclohexyl or benzyl, X and Y are hydrogen, methyl or $C_1$-$C_2$alkoxy, or wherein $R_1$ and $R_2$, together with the nitrogen atom to which they are attached, form a 5- or 6-membered ring which may optionally contain additional N- or O-atoms.

8. A process according to claim 1, wherein Q is a radical of the formula

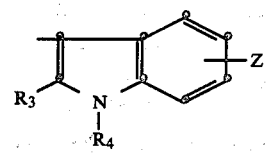

wherein $R_3$ is $C_1$-$C_4$alkyl or phenyl, $R_4$ is hydrogen, $C_1$-$C_4$alkyl or cyanoethyl, and Z is hydrogen, chlorine, methyl or $C_1$-$C_2$alkoxy.

9. A process according to claim 1, which comprises the use of the dye salt of the formula

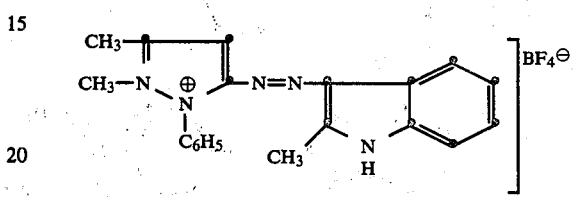

10. A process according to claim 1, which comprises the use of the dye salt of the formula

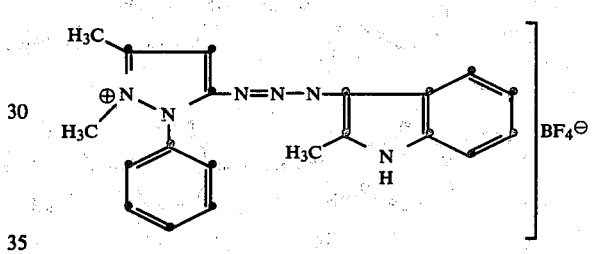

11. A process according to claim 1, which comprises the use of the dye salt of the formula

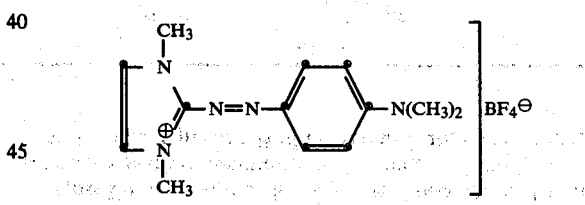

12. Spin-dyed fibres of polymers of acrylonitrile or of copolymers containing predominantly acrylonitrile, which fibres contain a dye salt according to claim 1.

* * * * *